Dec. 5, 1961    L. D. FURON    3,011,338
ULTRASONIC MEASUREMENT APPARATUS
Filed Nov. 7, 1957    2 Sheets-Sheet 1

INVENTOR.
LEON D. FURON
BY
Christie, Parker & Hale
ATTORNEYS

INVENTOR.
LEON D. FURON

United States Patent Office 3,011,338
Patented Dec. 5, 1961

3,011,338
ULTRASONIC MEASUREMENT APPARATUS
Leon D. Furon, Glendale, Calif., assignor to Automation Instruments Inc., Pasadena, Calif., a corporation of California
Filed Nov. 7, 1957, Ser. No. 694,954
2 Claims. (Cl. 73—67.9)

This invention relates to ultrasonic flaw detection apparatus, and more particularly, is concerned with apparatus for indicating the presence of poor bond between bonded layers in a laminated structure.

The use of ultrasonic sound waves to detect the presence of flaws in certain materials has heretofore been proposed as a nondestructive flaw detecting technique. For example, in many instances it is desirable to determine whether or not two laminated members are satisfactorily bonded together. There are a number of types of sandwich constructions in which various sheets of laminated materials are furnace-brazed or cemented by resin or plastic cements.

One method of detecting poor bonds between the laminated layers is to generate a short pulse of ultrasonic frequency which is propagated through the sample, and upon striking any discontinuity of propagation, such as an air space left by a poor bond between the laminated layers, is reflected, at least in part, back to the source. By measuring the interval between the emission and reception of the pulses, the distance of the flaw from the point of origin of the ultrasonic wave can be determined. The difficulty with such a system is that reflections from flaws within the sample close to the surface cannot be resolved from a large reflection taking place at the surface. Thus such flaw detection scheme is limited to detecting flaws in relatively thick samples, and then, only flaws that are spaced more than some minimum distance from the front surface of the material can be detected.

Another method used heretofore is to vibrate the outer skin of the laminated specimen at a frequency at which the skin can be caused to resonate. The power absorbed from the ultrasonic transducer provides a measure of the excellence of resonance and hence it provides a measure of the quality of the bond. If the outer skin is well bonded to the core material, resonant vibration is difficult to establish because a large part of the ultrasonic energy is absorbed by the core material. On the other hand, in areas where there is poor bond, the outer skin is backed by air which has very little ability to convey ultrasonic energy or to damp the vibration of the metal skin. Thus strong resonance effects may be observed in areas where there is a poor bond. The disadvantage of such a system, although it is capable of detecting flaws in very thin structures in contrast to the earlier technique, is that it can only detect flaws at the surface between the outer lamination and the remaining laminations or core of the material. Where the material involves a number of laminations, this method becomes impractical.

These difficulties of the prior art practices are overcome by the present invention. Thus the present invention provides means for detecting flaws at any depth or layer of a laminated bonded structure. This is accomplished by submerging the structure to be tested in a tank filled with liquid, such as water, which serves as an acoustic coupling medium. Ultrasonic energy is directed from a transducer located in the water in a direction normal to the surface of the laminated test structure. A reflecting surface, which may be the bottom of the tank for example, is located in spaced relationship from the opposite side of the test structure. The ultrasonic energy is propagated through the test structure and is reflected back by the spaced reflecting surface again through the test structure to the transducer.

By means of a fixed timing gate set to pass only energy reflected from the bottom of the tank, or other reflecting surface, it is possible to detect the presence of a flaw in the propagation path. If no flaws are present between the laminations of the test structure, the ultrasonic energy is propagated and reflected with a minimum of attenuation and passed to an indicator by the gate. However, if a flaw in the bond between any of the layers of the laminated structure is present, a substantial portion of the incident ultrasonic energy is reflected at the flaw, and hence very little energy is reflected off the bottom of the tank. Any energy that is reflected off the bottom of the tank is even further attenuated by the flaw on its return path to the transducer. Thus the absence of an output signal at the time the output is gated on indicates the presence of a flaw in the test structure.

For a more complete understanding of the invention, reference should be had to the accompanying drawings, wherein.

Figure 1:
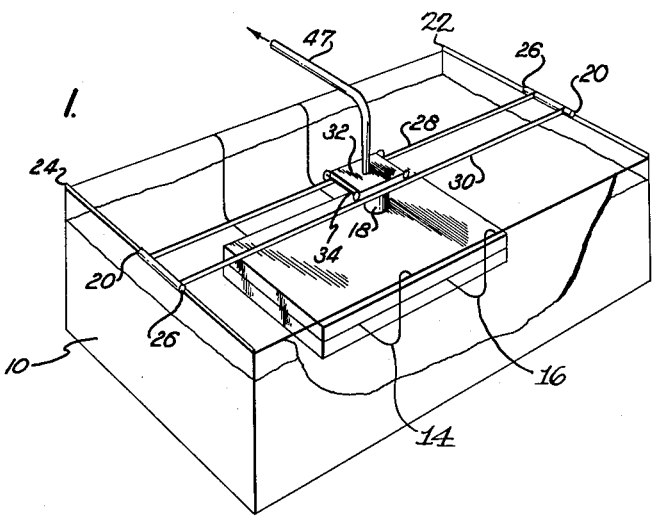
FIG. 1 is a perspective view, partially cut away, illustrating the testing tank structure.

Referring to FIG. 1 in particular, the numeral 10 indicates generally a metal tank which may be rectangular in form and of any suitable size, depending upon the size of the structures to be tested. The tank is filled with a suitable acoustic coupling medium, such as water. The test sample structure, such as indicated at 12, is completely immersed in the water but is separated from the bottom surface of the tank, as by suitable support means such as indicated at 14 and 16.

An ultrasonic transducer element 18 is suspended in the water above the sample 12. The transducer preferably is of a type employing a quartz or barium titanate crystal, which may be mechanically vibrated in response to electrical signals of frequencies in the megacycle range.

The transducer 18 is mounted for universal movement in a plane parallel to the upper surface of the laminated test structure 12. To this end a bridge structure 20 is provided, which extends between side rails 22 and 24 on either side of the tank. The bridge structure is guided on the side rails by suitable guide wheels 26.

The bridge structure 20 includes a pair of parallel rails 28 and 30 from which the transducer is supported by means of a small truck assembly 32 having guide wheels 34 which engage the rails 28 and 30. Thus universal movement of the transducer in a plane may readily be provided, either manually or by suitable motor drive means if so desired.

Figure 2:
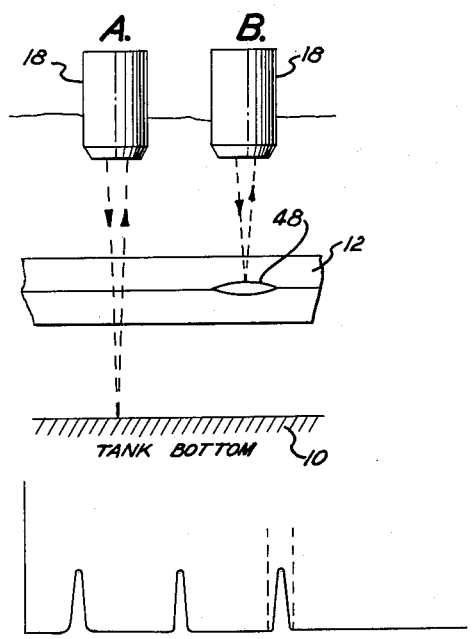
FIG. 2 is a simplified drawing showing the method of detecting flaws in a laminated structure.

Referring to FIG. 2, the principle of operation is therein illustrated. A portion of the test structure 12 is shown as having two bonded layers, with a flaw being indicated at 48 as an air space between the two laminations or layers. With the transducer 18 located in position A, the sound wave is propagated down through the test structure 12. A considerable amount of the energy is reflected back to the transducer by the front face. More of the energy is reflected back at the inner face between the layers and at the back face. The remaining energy is propagated onto the bottom of the tank and is reflected back through the test structure to the transducer 18. Of course multiple reflections occur at the various surfaces in response to the reflected wave as well as to the direct wave. By looking at the output from the transducer 18 at a fixed time interval following the pulsing of the transducer 18, the presence of the main reflected wave from the tank bottom can be detected.

However, if a flaw, providing an air space, exists anywhere in the laminated structure 12, as between the layers as indicated at 48, practically no energy is received from reflection off the tank bottom. The reason is that the air space 48 highly attenuates any energy propagated through the flaw. Although the flaw tends to reflect energy back to the transducer 18, the reflected wave from the flaw obviously returns to the transducer 18 in a shorter time than the wave normally reflected off the tank bottom, and therefore may be easily distinguished by proper gating from the reflection off the tank bottom. Thus it will be seen that in the presence of a flaw within the structure being tested, substantially no energy is received by the transducer 18 at the time corresponding to the normal reflection off the tank bottom.

Figure 3:
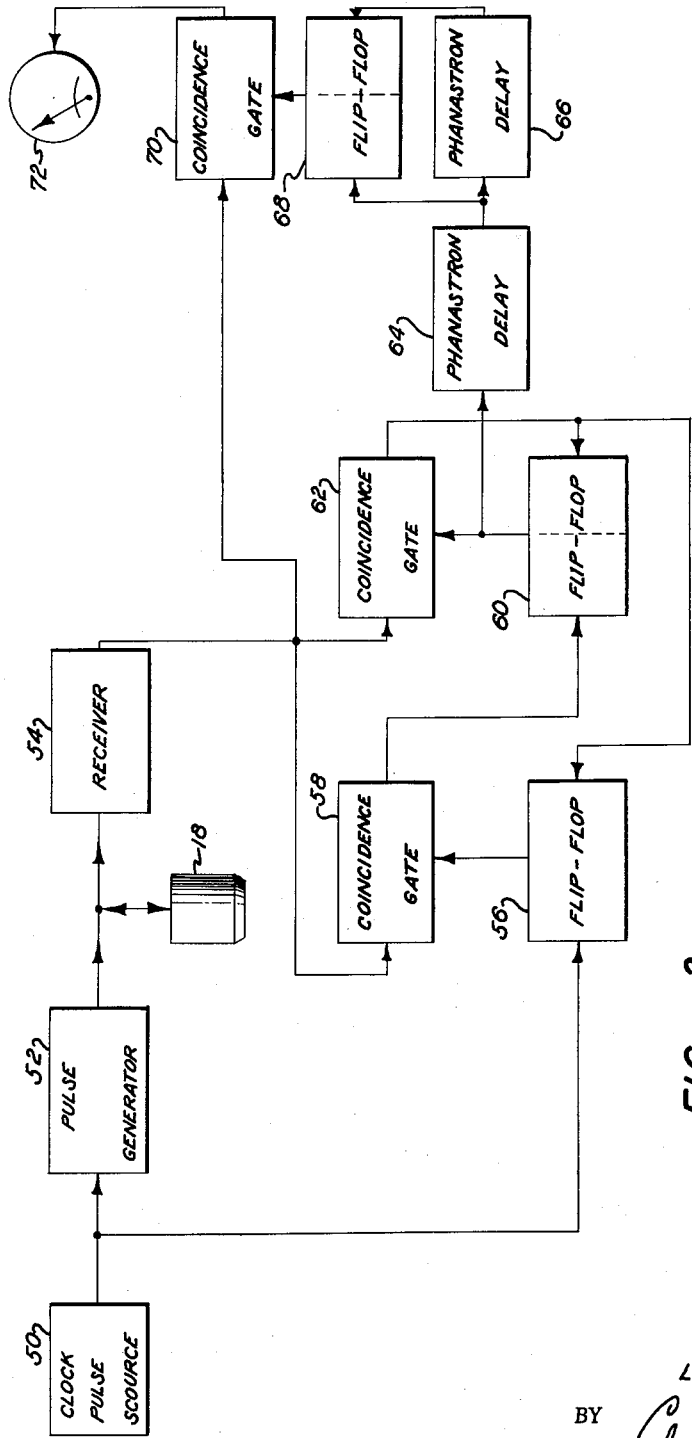
FIG. 3 is a circuit block diagram used in practicing the invention.

Referring to FIG. 3, a control circuit for operating the transducer 18 and deriving an indication therefrom is shown in block form. A clock pulse source 50 establishes the repetition rate at which the transducer 18 is pulsed. The output from the clock pulse source 50 synchronizes a pulse generator circuit 52. The output pulses from the generator 52 are applied to the transducer 18 and act to trigger the crystal of the transducer into oscillation. The transducer crystal rings for several cycles at its natural frequency, which may be of the order of several megacycles, generating compression or sound waves of that frequency in the acoustic coupling medium of the tank. The ultrasonic waves then reflected back to the transducer 18 mechanically vibrate the crystal of the transducer 18, producing an RF output signal which is fed to a receiver 54.

Figure 4:
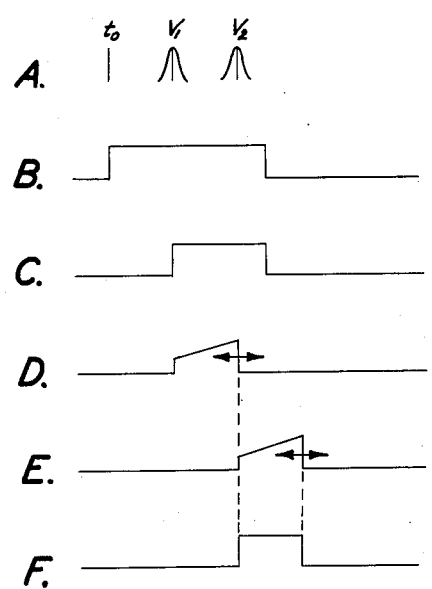
FIG. 4 is a series of wave forms generated in the circuit of FIG. 3, showing their time relation.

The receiver 54 may be a superheterodyne type for deriving output pulses corresponding to the envelopes of the bursts of RF energy derived from the transducer 18. Thus the output pulses from the receiver 54 correspond in time to the several reflections picked up by the transducer 18. FIG. 4A shows a wave form of a typical output signal from the receiver 54 during one pulse repetition interval of the source 50.

In order to determine whether a flaw is present or not, according to the principles of the invention as discussed above in connection with FIG. 2, it is necessary to gate the output from the receiver 54 at the proper time to determine whether a reflection from the bottom of the tank is present or not. To this end the output of the clock pulse source 50 is applied to one side of a bistable multivibrator or flip-flop circuit 56. The flip-flop circuit 56 controls a coincidence gate 58 to which is applied the output of the receiver 54. With the flip-flop triggered to its proper stable state for opening the coincidence gate 58, any output pulses derived from the receiver 54 may be passed by the gate 58. The "on" time of the coincidence gate 58 is indicated by the wave form of FIG. 4B.

The first main pulse put out by the receiver 54 is the pulse produced by reflection from the front surface of the test structure. This front surface pulse is passed by the coincidence gate 58 to a second flip-flop circuit 60. The flip-flop circuit 60 controls a second coincidence gate 62 such that when the flip-flop 60 is actuated by the first received pulse passed by the coincidence gate 58, the coincidence gate 62 is caused to open. The "on" time of the coincidence gate 62 is indicated by wave form of FIG. 4C.

The coincidence gate 62 is also coupled to the output of the receiver 54 so that the next pulse following the front surface pulse derived from the receiver 54 is passed by the coincidence gate 62 and applied to the flip-flop circuti 56. The pulse passed by the coincidence gate 62 resets the flip-flop 56 to its initial condition, closing the coincidence gate 58. It is also applied to the flip-flop circuit 60 for closing the coincidence gate 62.

The initial pulse from the receiver 54, corresponding to the front surface reflection, in actuating the flip-flop 60, produces a pulse which is coupled to a phantastron delay circuit 64. The phantastron delay circuit 64 is of conventional circuit design which produces a variable delay controlled by adjusting a D.C. bias level in the circuit. The output waveform is shown in FIG. 4D. The output from the phantastron delay circuit 64 is fed to a second phantastron delay circuit 66. The output waveform of the second phantastron is shown in FIG. 4E.

The output from the delay circuit 64 and the output of the delay circuit 66 are applied to opposite sides of a flip-flop 68 which controls a coincidence gate 70. The coincidence gate 70 is turned on in response to the first delay pulse derived from the delay circuit 64 and is turned off a time interval later, determined by the delay circuit 66 as shown by the gating waveform of FIG. 4F. The output of the receiver 54 is connected to the coincidence gate 70 for gating a selective portion of the received signal during each period of the clock source 50. It will be appreciated that by proper setting of the delay circuits 64 and 66, the coincidence gate 70 can be arranged to gate the portion of the receiver output corresponding to the pulse reflected off the bottom of the tank, since this pulse occurs at substantially a fixed time interval following the initiation of an ultrasonic signal by the clock pulse source 50.

The output from the coincidence gate 70 is applied to a suitable indicating device, indicated generally at 72. The indicating device 72, for example, may simply be a meter which integrates the pulses from the coincidence gate 70 and indicates the presence or absence of a series of pulses, depending upon whether the transducer 18 is located over a flaw or not. Thus by moving the transducer 18 over the surface of the laminated structure, it can be noted at what positions no pulses are produced at the output of the coincidence gate 70, by noting the absence of an indication on the meter 72.

From the above description it will be recognized that an improved method and apparatus for the protection of flaws is provided. The relative depth of the flaw in the material does not affect the indication. The gate on the output of the receiver can be carefully controlled and fixed in time relationship to the pulsing of the transducer, since only the pulses reflected off the bottom of the tank or other fixed reflecting surface are of concern. The gate can be made very narrow so as to improve discrimination against noise and other spurious reflections which might be passed by the gate. This arrangement also makes it possible to operate at lower ultrasonic frequencies than were heretofore required in flaw detection work.

What is claimed is:

1. Ultrasonic inspection apparatus for locating flaws in laminated structures comprising a tank having a substantially flat bottom, a liquid in the tank, the test structure being immersed in the liquid but spaced from the bottom of the tank, an ultrasonic transducer for converting electric signals to ultrasonic signals or ultrasonic signals to electric signals, the transducer being immersed in the liquid and oriented to direct ultrasonic waves at the bottom of the tank and receive ultrasonic waves reflected from the bottom of the tank, means for imparting scanning movement to the transducer parallel to the tank bottom for scanning the transducer over any selected area of the tank, the test structure being located in the tank between the transducer scanning area and the bottom, means for electrically pulsing the transducer periodically to generate sound pulses in the liquid, means for deriving an electrical output signal from the transducer in response to reflections of the ultrasonic pulses of energy produced by pulsing of the transducer, indicating means responsive to output signals from the transducer, gating means for coupling the output signals derived from the transducer to the indicating means, means synchronized with the pulsing of the transducer for opening the gating means a delayed interval following the pulsing of the transducer equal to the time the generated sound pulse takes to pass from the transducer to the reflective surface and back to the transducer, and means responsive to the opening of the gating means for closing the gating means a delayed interval substantially equal to the pulse duration time of the pulsed transducer.

2. Ultrasonic inspection apparatus for locating flaws in laminated structures comprising a tank including means defining an ultrasonic energy reflective planar surface, a liquid in the tank, the test structure being immersed in the liquid, an ultrasonic transducer for converting electric signals to ultrasonic signals or ultrasonic signals to electric signals, the transducer being immersed in the liquid and oriented to direct ultrasonic waves in a direction substantially normal to said reflective surface and to receive ultrasonic waves reflected from the reflective surface, means for imparting scanning movement to the transducer parallel to the plane of the reflective surface for scanning the transducer over any selected area of the tank, the test structure being located in the tank between the transducer scanning area and the reflective surface, means for electrically pulsing the transducer periodically to generate sound pulses in the liquid, means for deriving an electrical output signal from the transducer in response to reflections of the ultrasonic pulses of energy produced by pulsing of the transducer, indicating means responsive to output signals from the transducer, gating means for coupling the output signals derived from the transducer to the indicating means, means synchronized with the pulsing of the transducer for opening the gating means a delayed interval following the pulsing of the transducer equal to the time the generated sound pulse takes to pass from the transducer to the reflective surface and back to the transducer, and means responsive to the opening of the gating means for closing the gating means a delayed interval substantially equal to the pulse duration time of the pulse transducer.

References Cited in the file of this patent
UNITED STATES PATENTS

| | | |
|---|---|---|
| 2,280,226 | Firestone | Apr. 21, 1942 |
| 2,494,990 | De Lano | Jan. 17, 1950 |
| 2,593,865 | Erdman | Apr. 22, 1952 |
| 2,682,766 | Van Valkenberg | July 6, 1954 |

FOREIGN PATENTS

| | | |
|---|---|---|
| 699,796 | Great Britain | Nov. 18, 1953 |
| 1,140,291 | France | Jan. 20, 1956 |
| 535,714 | Belgium | June 1, 1955 |

OTHER REFERENCES

Articles: Location of Internal Defects by Supersonics, by Dice, published in Instruments, vol. 19, December 1946, pages 718,722. Design of an Ultrasonic Analyzer, published in Electronics, December, 1947, pages 102–105.